(12) United States Patent
Vassiliou et al.

(10) Patent No.: US 10,396,845 B2
(45) Date of Patent: *Aug. 27, 2019

(54) SPLIT MICROWAVE BACKHAUL TRANSCEIVER ARCHITECTURE WITH COAXIAL INTERCONNECT

(71) Applicant: Maxlinear Asia Singapore Private Limited, Singapore (SG)

(72) Inventors: Iason Vassiliou, Athens (GR); Michael Boers, West Pennant Hills (AU); Sean Nicolson, Irvine, CA (US); Brima Ibrahim, Laguna Hills, CA (US); Spyridon Kavvadias, Voula (GR)

(73) Assignee: Maxlinear Asia Singapore PTE LTD, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/444,633

(22) Filed: Feb. 28, 2017

(65) Prior Publication Data

US 2017/0179999 A1 Jun. 22, 2017

Related U.S. Application Data

(63) Continuation of application No. 13/436,046, filed on Mar. 30, 2012, now Pat. No. 9,621,330.

(Continued)

(51) Int. Cl.
*H04B 1/26* (2006.01)
*H04B 1/56* (2006.01)
(Continued)

(52) U.S. Cl.
CPC ............... *H04B 1/56* (2013.01); *H04B 1/26* (2013.01); *H04B 17/13* (2015.01); *H04B 17/14* (2015.01);
(Continued)

(58) Field of Classification Search
CPC . H04B 1/56; H04B 1/26; H04B 17/21; H04B 17/14; H04B 17/13; H04L 5/143; H04L 5/1461; H04L 27/368; H04L 27/02
See application file for complete search history.

(56) References Cited

U.S. PATENT DOCUMENTS 5,548,807 A 8/1996 Ueda
5,640,691 A 6/1997 Davis et al.
(Continued)

FOREIGN PATENT DOCUMENTS

CN 101465705 6/2009
CN 10177144 7/2010
(Continued)

OTHER PUBLICATIONS

"Fixed Radio Systems; Point-to-Point Equipment; Presenting Important Aspects of the Spatial Frequency Reuse Method; DTR/TM-4153", European Telecommunications Standards Institute, Nov. 23, 2006, Valbonne, France; pp. 1-35.
(Continued)

*Primary Examiner* — Yuwen Pan
*Assistant Examiner* — Fatuma G Sherif
(74) *Attorney, Agent, or Firm* — McAndrews, Held & Malloy, Ltd.

(57) ABSTRACT

A communication system includes a conversion module configured to convert a signal between a radio frequency baseband (RF-BB) and an intermediate frequency (IF). At least one RF front-end module converts the signal between the IF and a radio frequency (RF). The RF front-end module is configured as an RF phased array and includes a coaxial interconnect configured to connect the conversion module with the RF front-end module. The signal is transmitted between the conversion module and the RF-front end module via the coaxial interconnect. At least one RF front-end (Continued)

module includes an active front-end (AFE) configured to allow the signal to be transmitted via the coaxial interconnect while minimizing any deterioration of the signal.

20 Claims, 8 Drawing Sheets

Related U.S. Application Data (60) Provisional application No. 61/565,469, filed on Nov. 30, 2011.

(51) Int. Cl.

| | | |
|---|---|---|
| *H04L 5/14* | (2006.01) | |
| *H04B 17/13* | (2015.01) | |
| *H04B 17/14* | (2015.01) | |
| *H04B 17/21* | (2015.01) | |
| *H04L 27/02* | (2006.01) | |
| *H04L 27/36* | (2006.01) | |

(52) U.S. Cl.
CPC ............ *H04B 17/21* (2015.01); *H04L 5/143* (2013.01); *H04L 5/1461* (2013.01); *H04L 27/02* (2013.01); *H04L 27/368* (2013.01)

(56) References Cited

U.S. PATENT DOCUMENTS

| | | | |
|---|---|---|---|
| 5,748,037 A | 5/1998 | Rozental et al. | |
| 5,870,267 A * | 2/1999 | Kitano | G06F 1/206 |
| | | | 361/103 |
| 5,987,060 A | 11/1999 | Grenon et al. | |
| 6,144,165 A | 11/2000 | Liedenbaum | |
| 6,731,946 B1 | 5/2004 | Stanwood et al. | |
| 6,782,211 B1 | 8/2004 | Core | |
| 7,643,512 B2 | 1/2010 | Gorsetman et al. | |
| 7,839,842 B2 | 11/2010 | Zhang et al. | |
| 7,856,048 B1 | 12/2010 | Smaini et al. | |
| 8,018,375 B1 | 9/2011 | Alexopoulos et al. | |
| 8,095,088 B2 | 1/2012 | Shen et al. | |
| 8,488,970 B2 | 7/2013 | Huang et al. | |
| 2003/0043077 A1 | 3/2003 | Alexopoulos et al. | |
| 2003/0137329 A1 | 7/2003 | Van Der Valk et al. | |
| 2003/0152140 A1 | 8/2003 | Antoniak | |
| 2003/0156668 A1 | 8/2003 | Atkinson et al. | |
| 2004/0106380 A1* | 6/2004 | Vassiliou | H04B 17/20 |
| | | | 455/73 |
| 2004/0157637 A1* | 8/2004 | Steer | H01Q 1/246 |
| | | | 455/525 |
| 2004/0203528 A1 | 10/2004 | Ammar et al. | |
| 2004/0204109 A1* | 10/2004 | Hoppenstein | H01Q 1/246 |
| | | | 455/562.1 |
| 2005/0124307 A1 | 6/2005 | Ammar et al. | |
| 2006/0098614 A1 | 5/2006 | Moon et al. | |
| 2006/0135104 A1 | 6/2006 | Lee et al. | |
| 2007/0069901 A1 | 3/2007 | Tuck et al. | |
| 2007/0086376 A1* | 4/2007 | Prager | F24F 11/0086 |
| | | | 370/328 |
| 2007/0129031 A1 | 6/2007 | Newton et al. | |
| 2008/0002581 A1 | 1/2008 | Gorsetman et al. | |
| 2008/0014866 A1 | 1/2008 | Lipowski et al. | |
| 2008/0051040 A1 | 2/2008 | Shen et al. | |
| 2008/0136704 A1 | 6/2008 | Chan et al. | |
| 2008/0287076 A1 | 11/2008 | Shen et al. | |
| 2009/0115757 A1 | 5/2009 | Bae | |
| 2009/0124213 A1 | 5/2009 | Rubin et al. | |
| 2009/0152445 A1 | 6/2009 | Gardner, Jr. | |
| 2009/0168864 A1 | 7/2009 | Teramoto | |
| 2009/0232257 A1 | 9/2009 | Bury | |
| 2010/0062726 A1* | 3/2010 | Zheng | H04B 1/40 |
| | | | 455/74 |
| 2010/0067476 A1 | 3/2010 | Periyalwar et al. | |
| 2010/0197261 A1 | 8/2010 | Zibrik et al. | |
| 2010/0272163 A1 | 10/2010 | Prager et al. | |
| 2011/0051654 A1 | 3/2011 | Blankenship et al. | |
| 2011/0063169 A1* | 3/2011 | Chen | H01Q 3/2694 |
| | | | 342/368 |
| 2011/0080985 A1 | 4/2011 | Secker et al. | |
| 2011/0286552 A1 | 11/2011 | Briand | |
| 2012/0083304 A1 | 4/2012 | Yang et al. | |
| 2012/0093100 A1 | 4/2012 | Qin et al. | |
| 2012/0195392 A1 | 8/2012 | Kushnir et al. | |
| 2012/0220246 A1 | 8/2012 | Kushnir et al. | |
| 2012/0307695 A1* | 12/2012 | Yehezkely | H01P 5/20 |
| | | | 370/310 |
| 2013/0094554 A1 | 4/2013 | Kennard et al. | |
| 2013/0135985 A1 | 5/2013 | Friedmann et al. | |
| 2013/0135986 A1 | 5/2013 | Sturkovich et al. | |
| 2013/0136039 A1 | 5/2013 | Sturkovich et al. | |
| 2013/0136163 A1 | 5/2013 | Friedmann et al. | |
| 2013/0178177 A1 | 7/2013 | Kushnir et al. | |

FOREIGN PATENT DOCUMENTS

| | | |
|---|---|---|
| CN | 102255119 | 11/2011 |
| EP | 1298848 | 4/2003 |
| EP | 2299775 | 3/2011 |
| JP | 4462043 | 2/2010 |
| JP | 2011199880 | 10/2011 |
| WO | 2011032790 | 3/2011 |

OTHER PUBLICATIONS

European Search Report Appln No. 13005543.7, dated Mar. 4, 2014 (9 pgs.).
CPRI Specification V5.0—Common Public Radio Interface (CPRI); Interface Specification, Ericsson AB, Huawei Technologies Co., Ltd., NEC Corp., Alcatel Lucent and Nokia Siemens Networks GmbH & Co. KG, pp. 1-119, Sep. 21, 2011.
IEEE Standard for Information Technology—Telecommunications and Information Exchange Between Systems—Local and metropolitan Area Networks—Specific Requirements, Version 802.3-2008 (Revision of 802.3-2005), Part 3: Carrier Sense Multiple Access with Collision Detection (CSMA/CD) Access Method and Physical Layer Specifications, Section 4, pp. 1-586, IEEE, Piscataway, NJ, 2008.
Kuwano, S. et al., "Digitized Radio-over-Fiber (DROF) System for Wide-Area Ubiquitous Wireless Network," MWP 06: International Topical Meeting on Microwave Photonics, 4 pages, 2006.
Partial European Search Report for Appln No. 12006163 dated Apr. 3, 2013 (9 pgs.).
Communication from European Patent Office for Appln No. 12006163.5 dated Mar. 11, 2014 (9 pgs.).

\* cited by examiner

SPLIT MICROWAVE BACKHAUL TRANSCEIVER ARCHITECTURE WITH COAXIAL INTERCONNECT

CROSS REFERENCE TO RELATED APPLICATIONS

This patent application is a continuation of U.S. application Ser. No. 13/436,046, filed Mar. 30, 2012, which claims priority to U.S. Provisional Patent Application Ser. No. 61/565,469 filed on Nov. 30, 2011, now expired. Each of the above applications is incorporated herein by reference in its entirety.

BACKGROUND OF THE INVENTION

Field of the Invention

The invention relates to a split microwave transceiver, and more specifically to a split microwave transceiver incorporating a coaxial interconnect.

Related Art

Local area networks (LANs) and systems incorporating Bluetooth or WiFi technology have recently become widely implemented communication technologies, especially in personal computing devices. Typical implementations of these conventional technologies, as well as other communication technologies, include an antenna connected to a radio device using a coaxial cable. The radio device is normally located on a printed circuit board (PCB) within the computing device. However, if the antenna were also to be located on the PCB, the antenna would not be able to radiate properly. Therefore, a typical implementation includes a coaxial cable connecting the radio device to an antenna located in a different area of the computing device.

The coaxial cable is commonly routed from the radio device, located on the PCB, through the casing of the computing device and into the periphery of the device. In an embodiment where the computing device represents a laptop computer, the coaxial cable is commonly routed to the clutch barrel or to somewhere in the top lid of the laptop computer, to provide some examples. The reason for this is that each of these locations allows the antenna to properly radiate, which is not possible when the antenna is located on the PCB along with the radio device. However, conventional coaxial cable routing becomes more and more of a problem as operation frequency rises. For example, when the communication system operates at a commonly utilized frequency of 60 GHz, the system does not function properly. In particular, routing the 60 GHz signal through the coaxial cable results in significant losses and degradation of the signal. Thus, there is a need for an alternative to these conventional communication systems, which allows for a 60 GHz signal to be converted and subsequently transmitted over a coaxial cable without incurring significant losses or degradation of the signal.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

FIGS. 2.1 and 2.2 are schematic diagrams of an IF to BB/BB to IF conversion module and an RF front-end module, respectively, which together comprise a communication system according to an exemplary embodiment of the invention;

FIGS. 7.1-7.3 are block diagrams of communication systems having multiple front-end modules according to exemplary embodiments of the invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE INVENTION

In computing devices incorporating conventional communication technologies, a coaxial cable may be used to connect a radio device to an antenna. The antenna and the radio device may be located in different areas of the computing device. Typically, a coaxial cable connects the radio device to the antenna. The cable is routed from the radio device, which may be located on a printed circuit board (PCB), through the casing of the computing device and into the periphery of the device. The reason for this routing technique is that the antenna is usually located in the periphery of the computing device so that the antenna can radiate properly, which it would not have been able to do if it were located on the PCB along with the radio device. However, when the communication system operates at a commonly utilized frequency of 60 GHz, the system does not function properly due to significant losses and deterioration of the signal. Thus, there is a need for an alternative, which allows for a 60 GHz signal to be transmitted over a coaxial cable without incurring significant losses or deterioration of the signal.

This Detailed Description refers to accompanying drawings that illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

This Detailed Description of exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the invention is described in terms of wireless communication, those skilled in the relevant art(s) will recognize that the present invention may be applicable to other communications that use wired or other wireless communication methods without departing from the spirit and scope of the present invention.

An Exemplary Communication System

Figure 1:
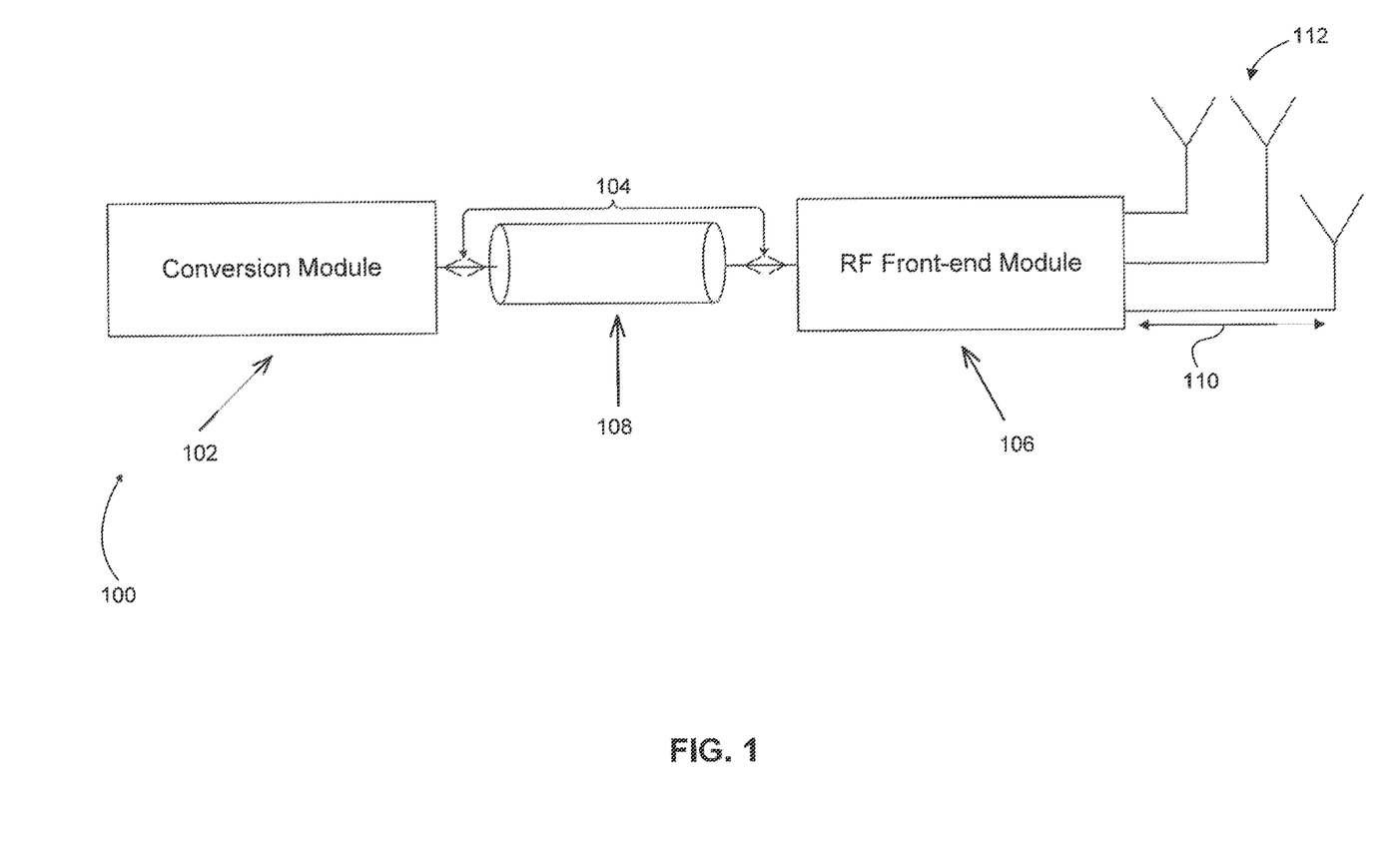
FIG. 1 is a block diagram of a communication system according to an exemplary embodiment of the invention.

FIG. 1 is a block diagram of a communication system according to an exemplary embodiment of the present disclosure.

A communication system 100 includes a conversion module 102, which is configured to convert a signal 104 between an analog or digital baseband (BB) signal and an intermediate frequency (IF), before up-converting in a transmission mode (or after down converting in a receipt mode) the signal 104 to (or from in a receipt mode) a final radio frequency (RF). In an exemplary embodiment, the signal 104 may include an 8.64 GHz IF modulated signal, which itself may contain a 270 Mz PLL reference signal and a 2.16 GHz modulated control signal, to provide an example. However, other types of signals may be possible without departing from the spirit and scope of the present disclosure. The 2.16 GHz modulated control signal may be used for programming and real time control of an RF front-end module 106. The 8.64 GHz IF modulated signal may also be upconverted to an RF signal 110 at the 60 GHz band. Additionally, in such an exemplary embodiment, the conversion module 102 may be implemented on a platform or an a wireless card, to provide some example; however, it may be possible to implement the conversion module 102 on other mediums without departing from the spirit and scope of the present disclosure. The conversion module 102 may also be implemented as a system on chip (SOC), in which all of the components contained within the conversion module 102 are integrated into a single chip. The conversion module 102 will be described in greater detail later in this patent document.

The communication system 100 also includes an RF front-end module 106. The RF front-end module 106 is configured to convert the signal 104 between the IF and a radio frequency (RF). In an exemplary embodiment, the RF front-end module 106 may represent an RF phased array front-end module. In such an exemplary embodiment, the RF phased array front-end module may include an antenna array 112 in which the relative phases of the respective signals being fed into the antennas are varied in such a way that the effective radiation pattern of the antenna array 112 is reinforced in a desired direction and suppressed in undesired directions. Additionally, as used in this disclosure, the antenna array 112 represents a group of multiple active antennas coupled to a common source or load to produce a directive radiation pattern. In an exemplary embodiment, the antenna array 112 may radiate a 60 GHz signal, to provide an example; however, other signals are possible without departing from the spirit and scope of the present disclosure.

The RF front-end module 106 also includes an active front-end (AFE). In a transmission (TX) mode, the RF front-end module 106 upconverts the 8.64 GHz IF modulated signal from the signal 104 to the RF signal 110 (e.g., 60 GHz). The RF front-end module 106 also splits the RF signal 110 into N distinct paths using a network of power dividers and intermediate amplifiers to overcome a divider loss. Additionally, using multiple phase shifters having adjustable phases followed by multiple power amplifiers, the RF front-end module 106 feeds N different antennas, which make up the antenna array 112, to create a beam-forming transmitter.

In a reception (RX) mode, the RF front-end module 106 receives RF signals from N different RF front-ends, each consisting of multiple low-noise amplifiers (LNAs) and the multiple phase shifters having adjustable phases. The RF front-end module 106 is configured to combine the RF signal into a common RF path (the RF signal 110) using a network of power combiners and amplifiers to overcome combiner power loss. The RF front-end module 106 then downconverts the RF signal 110 to IF and multiplexes the RF signal 110 to a coaxial interconnect 108 for transmission to the conversion module 102.

The RF front-end module 106 is configured to be a stand-alone module that includes a frequency synthesis block, which generates a local oscillator (LO) signal necessary for RF-IF and IF-RF conversions by multiple mixers, a digital block, which includes programming information for multiple RF blocks, a control block, which is configured to modulate and demodulate control commands to be transmitted/received over the coaxial interconnect 108 at the frequency of 2.16 GHz, to provide an example. The stand-alone RF front-end module 106 also include multiple bias blocks, voltage regulators and other auxiliary circuitry. The RF front-end module 106 is thus positioned at a different location than the conversion module 102. The RF front-end module 106 will also be described in greater detail later in this disclosure.

Additionally, the communication system 100 includes a coaxial interconnect 108, which connects the conversion module 102 with the RF front-end module 106. In an exemplary embodiment, the coaxial interconnect 108 may be a conventional coaxial cable. In such an exemplary embodiment, the signal 104 is transmitted between the conversion module 102 and the RF front-end module 106 over the coaxial interconnect 108. Additionally, the signal 104 contains the modulated signal, at an IF frequency, and is transmitted over the coaxial interconnect 108. In an exemplary embodiment, since the IF frequency (e.g., 8.84 GHz) is much lower than the RF frequency (e.g., 60 GHz) the coaxial interconnect 108 is capable of transferring the signal 104 between the conversion module 102 and the RF front-end module 106 without incurring any significant losses, therefor signal quality, measured by signal to noise ratio (SNR), is not degraded.

The communication system 100 may represent an exemplary embodiment of a super-heterodyne 60 GHz phase antenna array transceiver. In such an exemplary embodiment, the signal 104 may be converted to an IF signal using a frequency mixing technique or a heterodyning technique, to provide some example; however, other techniques may be possible without departing from the spirit and scope of the present disclosure. Additionally, the communication system 100 may be implemented inside of a laptop computer, a tablet computing device, or personal digital assistant (PDA), to provide some examples. However, these example devices are for illustrative purposes only, and those skilled in the relevant art(s) will recognize that the communication system 100 may be implemented inside other devices without departing from the spirit and scope of the present disclosure.

Figure 21:
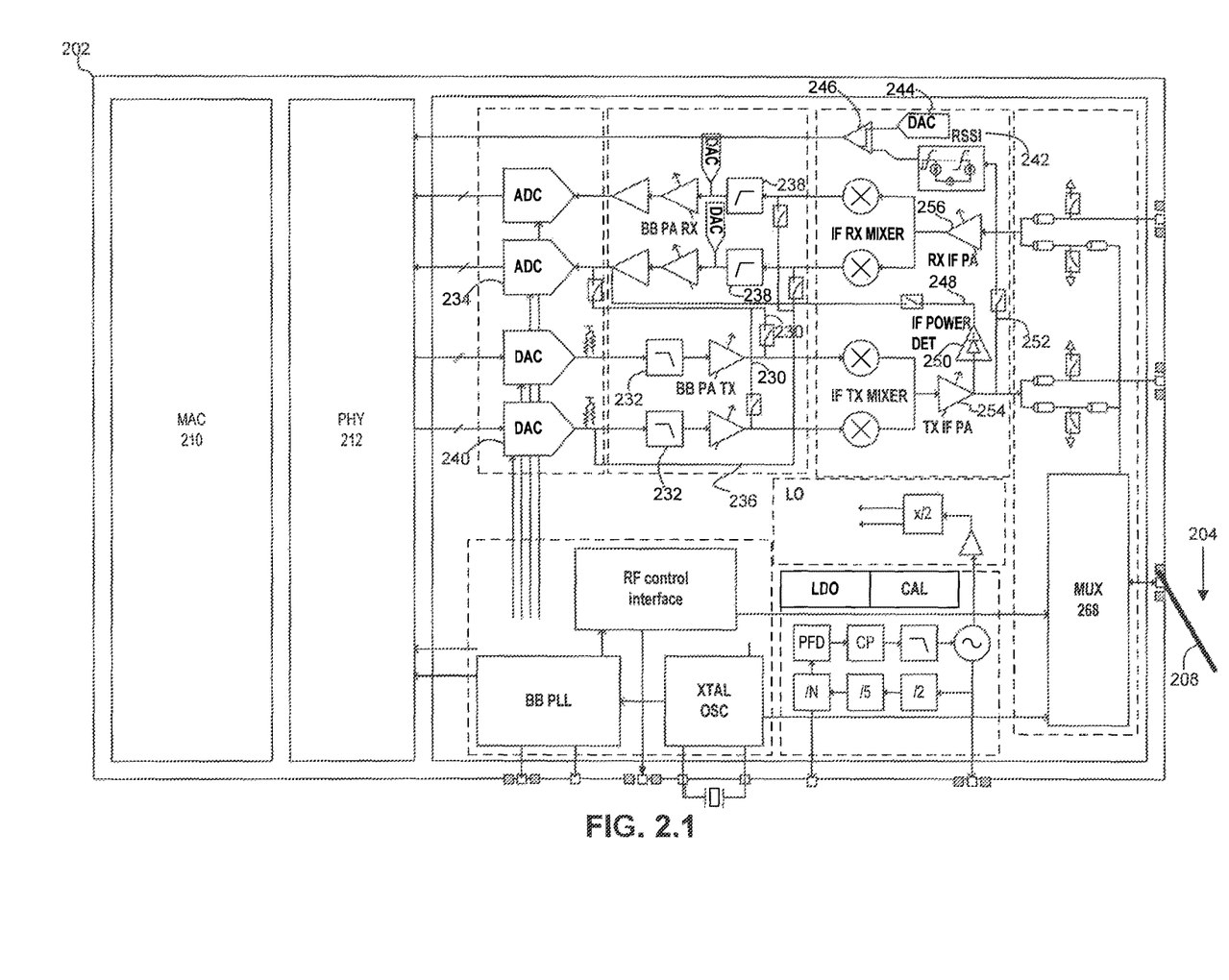
Figure 22:
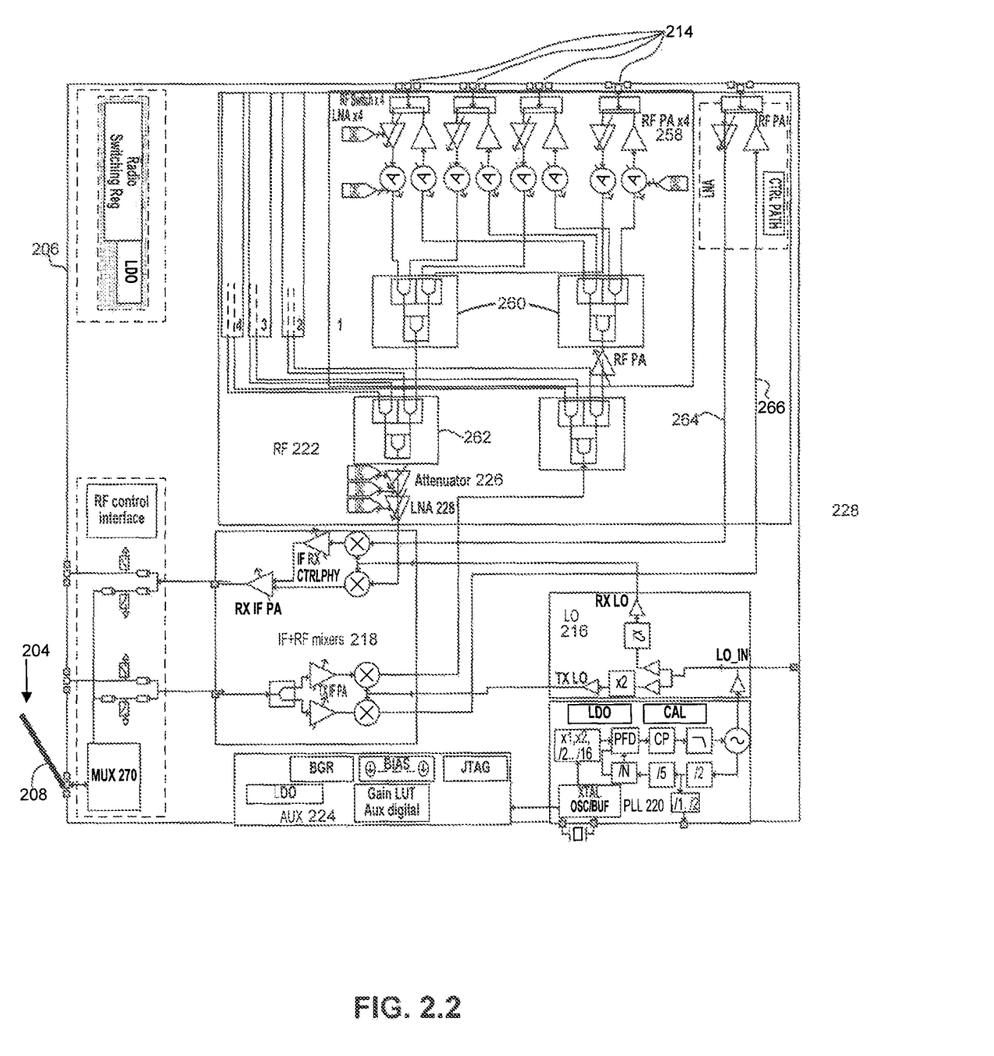

Referring also to FIGS. 2.1 and 2.2, schematic diagrams of a conversion module and an RF front-end module, which together comprise a communication system according to an exemplary embodiment of the present disclosure, are shown.

A communication system 200 (not labeled in FIG. 2.1 or 2.2) may represent an exemplary embodiment of the communication system 100. Also, the communication system 200 includes a conversion module 202, which may represent an exemplary embodiment of the conversion module 102. Further, in an exemplary embodiment, the conversion module 202 may be a Broadcom Corporation BCM20110, which supports the RF-BB to IF conversion as well as other digital processing functions. The Broadcom Corporation BCM20110 is illustrative, and it is not the only conversion module capable of being used to implement the invention, and is not meant to limit this disclosure. In particular, any conversion module that functions as described herein may be used.

Additionally, the conversion module 202 is capable of performing the baseband to IF conversion upon transmission of a signal 204, and an IF to baseband conversion upon receipt of the signal 204, which may be performed by multiple IF amplifiers and mixers. The conversion module 202 also includes a media access controller 210 (MAC) and a physical layer 212 (PHY), which perform the aforementioned other digital processing functions, as well as multiple analog to digital converts (ADCs) and digital to analog converters (DACs) to convert the BB analog signal into a BB digital signal in receive mode and the BB digital signal into the BB analog signal in transmit mode. Further, the conversion module 202 may include an IF PLL, which is configured to generate the required LO signal to convert BB to IF and IF to BB, and a BB PLL configured to generate analog to digital and digital to analog sampling clocks. A frequency doubler and a polyphase filter may also be included, and may be used to convert to 8.64 GHz I/Q LO signals. In an exemplary embodiment, the PLL may be at 4.32 GHz, to provide an example.

Further, the communication system 200 includes an RF front-end module 206, which may represent an exemplary embodiment of the RF front-end module 106. As discussed above, the RF front-end module 206 may represent an RF phased array front-end module. Additionally, the RF front-end module 206 may include an RF to IF and an IF to RF converter as well as a band-split filter configured to separate the IF, PLL reference, DC feed and control signals. In an exemplary embodiment, the RF front-end module 206 may be a Broadcom Corporation BCM20100, which supports the IF to RF conversion as well as other functions associated with the AFE. The Broadcom Corporation BCM20100 is provided for illustrative purposes only, and it is not intended to be the only RF front-end module capable of being used herein, and is not meant to limit this disclosure. In particular, any RF front-end module that meets the strict specifications described in this disclosure may be used.

The RF front-end module 206 is capable of performing the IF to RF conversion upon transmission of the signal 204, and an RF to IF conversion upon receipt of the signal 204. The RF front-end module 206 also includes multiple antennas 214 integrated into the chip substrate, an integrated local oscillator (LO) 216 and a phase-locked loop (PLL) 220 that uses a reference from the coaxial interconnect 208, as described previously in this disclosure, and produces, using a frequency doubler after a voltage-controlled oscillator (VCO), the LO signal for the four different 60 GHz channels supported. The RF to IF conversion is performed by and array of N LNAs, for illustrative purposes only, N=16; however, this is not meant to limit this disclosure and N may equal other values without departing from the spirit and scope of the present disclosure. Thus, in an exemplary embodiment, the 16 LNAs may be fed by 16 different antennas via an integrated switch. In addition to the N LNAs, the RF to IF conversion is performed using N phase shifters that perform beamforming, one or more power combiners 260 and 262, a network that combines the signal from the N phase shifters to perform beamforming, a programmable gain attenuator 226 and LNA 228 configured to overcome power combiner losses and perform gain control prior to a RF mixer in order to avoid signal saturation in strong signal conditions, the RF mixer configured to convert the signal to IF and an IF amplifier and a multiplexer (MUX) configured to multiplex the IF signal into the coaxial interconnect 208. The IF to RF conversion includes an IF amplifier and RF mixer to convert the signal to RF, a power divider network with interpolated RF amplifiers configured to overcome divider loss associated with feeding N different RF paths having multiple phase shifters, multiple power amplifiers and multiple RF switches. In an exemplary embodiment, the RF front end elements are split into 4 identical blocks, where each block includes 4 TRX switches, 4 LNAs, 4 PAs, 4 TX phase shifters, 4 RX phase shifters, a 4:1 power combiner and a 1:4 power divider, to provide an example; however, other RF front end configurations are possible without departing from the spirit and scope of the present disclosure. The 4 identical RF paths are connected with a 4:1 power combiner in RX mode followed by an LNA, an attenuator, and a 1:4 divider in TX forming RF block 222. The aforementioned functional blocks are recited for illustrative purposes only, and it will become apparent to those skilled in the relevant arts that other functional blocks may be included within the RF front-end module 206 without departing from the spirit and scope of the present disclosure.

The communication system 200 also includes a coaxial interconnect 208, which may represent an exemplary embodiment of the coaxial interconnect 108. The coaxial interconnect 208 is configured to allow for single coaxial interface multiplexing of the signal 204, which is an IF signal when it being transmitted across the coaxial interconnect 208. The coaxial interconnect 208 is also configured to transmit a PLL reference element associated with the IF to RF conversion, a control interface associated with both the IF to RF and RF to IF conversions, and a DC feed associated with the IF to RF conversion. This allows the conversion module 202 and the RF front-end module 206 to be located in different regions of a final product incorporating the communication system 200.

Additionally, the RF front-end module 206 includes a dedicated omnidirectional receipt path 264 that avoids power combiner loss by using a separate path from the paths described previously in this disclosure. The dedicated omnidirectional receipt path 264 ensures optimal performance of the RF front-end module 206 while operating in an omnidirectional mode. This implementation of the dedicated omnidirectional receipt path 264 avoids the otherwise inherent problem of incurring high power divider losses, which could degrade the signal 204 if only one of the N paths of the array was used for reception during omni-directional mode. In an exemplary embodiment, a dedicated omnidirectional transmission path 266 may be implemented in a similar manner as with the dedicated omnidirectional receipt path 264 recited above. The dedicated omnidirectional transmission path 266 also avoids the otherwise inherent problem of incurring high power divider losses, which allows for a higher output power to be achieved in a TX omnidirectional mode.

The conversion module 202 also includes a first loop-back path 248 used to measure transmit IQ mismatch and LO feedthrough. By using the measured parameters provided by this path, TX I/Q mismatch and LO feedthrough are subsequently removed using digital pre-distortion. Path 248 includes an IF detector 250 connected to the output of a TX IF amplifier 254 and loops the rectified signal from 250 to multiple RX ADCs 234. Additionally, the conversion module 202 includes a second loop-back path 252 used to measure RX I/Q mismatch. By using the measured parameters provided by this path, RX I/Q mismatch is subsequently removed using digital post-distortion. The second loop-back path 252 extends between the TX IF amplifier 254 and a receive IF amplifier 256. Additionally, multiple third loop-back paths 230 are configured to facilitate measurement and calibration of a variety of transmit baseband (BB) filters 232. The third loop-back paths 230 extend between outputs the TX BB filters 232 and the RX ADCs 234. Further, the conversion module 202 includes a fourth loop-back path 236, which is configured to facilitate the calibration of a variety of receive BB filters 238. The fourth loop-back path 236 extends between an output of a digital-to-analog converter (DAC) 240 and inputs of the RX BB filters 238. By using these paths, the characteristics of the transmit filters can be measured and adjusted for by appropriate programming.

Further, the conversion module 202 may also include a received signal strength indictor (RSSI) 242. In an exemplary embodiment, an output of the RSSI 242 and an output of a programmable DAC 244 may be input into a comparator 246. Consequently, an output of the comparator 246 can be used to detect a specific threshold after which a determination can be made that the input power has exceeded a certain threshold, so that the conversion module 202 can adapt its gain, which may be necessary during automatic gain control (AGC) operations. Thus, the output of the RSSI 242 is compared with a target voltage corresponding to a target input power for the conversion module 202. The combination of the RSSI 242 and the programmable DAC 244 can operate significantly faster and can consume less power than a dedicated RSSI-ADC combination. In an exemplary embodiment, two comparators can be used in order to determine whether the input power is within a certain range.

In an exemplary embodiment, actual implementation of the communication system 200 involves multiplexing a reference, IF, and a control radio using a passive filter network. This is achieved by placing a first multiplexer (MUX) 268 into the conversion module 202 and place a second MUX 270 into the RF front-end module 206. The coaxial cable 208 then connects to both the first MUX 268 and the second MUX 270. This connection technique allows the conversion module 202 and the RF front-end module 206 to have the same output impendence Further, both the first MUX 268 and the second MUX 270 may include a duplexer/triplexer design, in which a 2.16 GHz filter is used to hide an RF choke from a path of the signal 204, to provide an example. As used in this disclosure, an RF choke represents a blocking of higher-frequency alternating currents in an electrical circuit while allowing the passage signals having a lower frequency or a direct current, by having an impedance that is largely determined by reactance, and which is proportional to frequency. However, it will become apparent to persons skilled in the relevant art(s) that other MUX designs are within the scope and spirit of the present disclosure.

An Exemplary Method of Calibrating RF Gain Steps of a Communication System

Due to limitations in integrated circuit processes and modeling technologies, circuits operating at 60 GHz generally experience significantly larger parametric variations due to process, temperature and voltage (PVT variations) than lower frequency systems such as Bluetooth and WiFi. Among such variations, gain and gain step variation can create problems in performing automatic gain control (AGC), because a certain degree of predictability in the gain in needed. Therefore, a calibration method is needed to allow the communication system to operate properly at 60 GHz.

Additionally, calibration of the communication system cannot be performed in a factory setting because antennas are integrated into an RF chip within the communication system, thus restricting access to RF input/output ports positioned on the RF chip. Further, calibrating the communication system is complicated due to the fact that a signal cannot be sent and received at the same time over a single coaxial cable. In particular, the signal traveling in a transmission direction and the signal traveling in a receipt direction would have the same frequencies.

Figure 3:
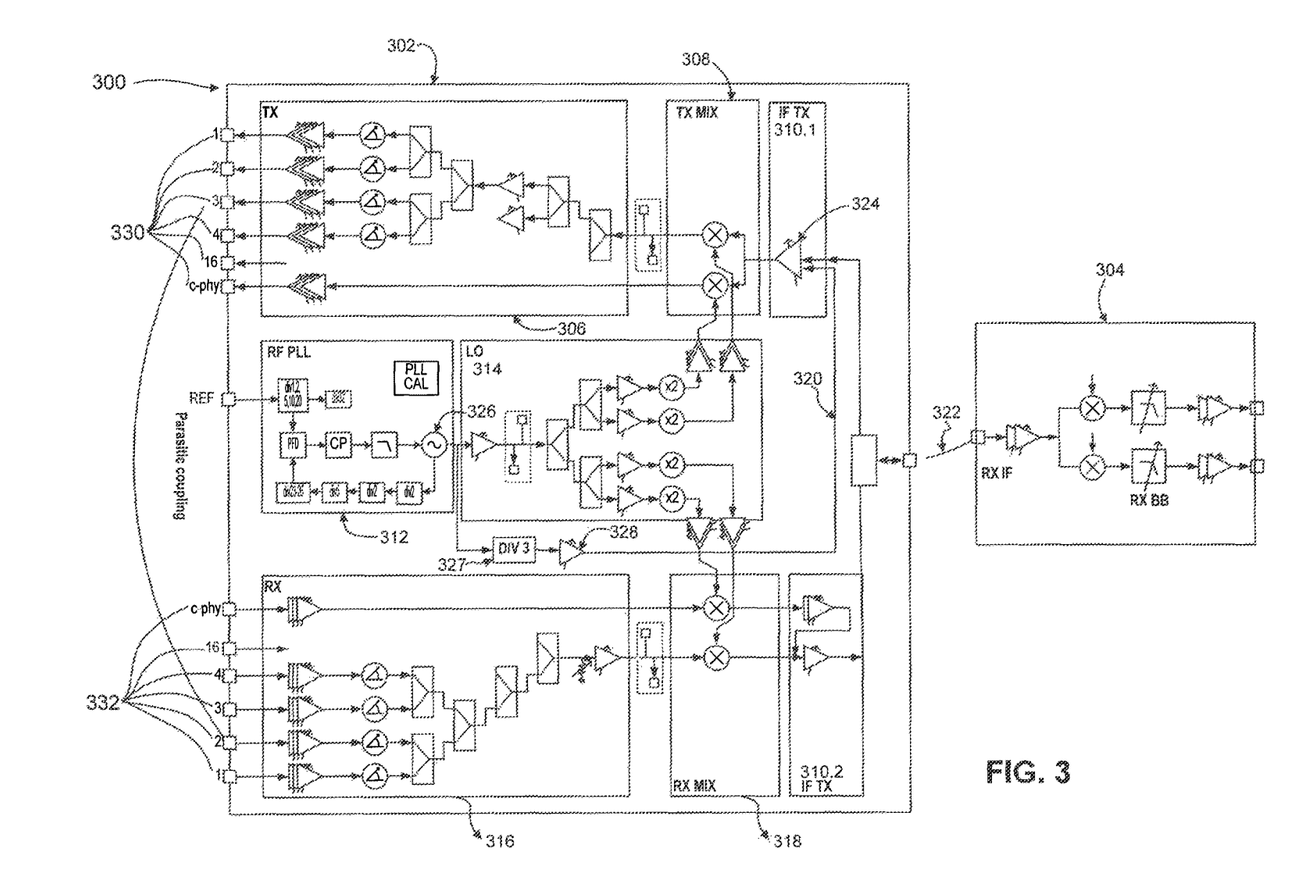
FIG. 3 is a schematic diagram of a communication system having an RF loop-back path configured to calibrate an RF gain step of the communication system according to an exemplary embodiment of the present disclosure.

FIG. 3 is a schematic diagram of a communication system having an RF loop-back path configured to calibrate an RF gain step of the communication system according to an exemplary embodiment of the present disclosure.

A communication system 300 may represent an exemplary embodiment of the communication system 200. The communication system 300 includes an RF chip 302, which may represent an exemplary embodiment of the RF front-end module 206. In an exemplary embodiment, the RF chip 302 may be a Broadcom Corporation BCM20100; however, the Broadcom Corporation BCM20100 is provided for illustrative purposes only, and it is not intended to be the only RF chip capable of being used herein, and is not meant to limit this disclosure. In particular, any RF chip that meets the strict specifications described in this disclosure may be used.

Additionally, the RF chip 302 includes a transmission block 306, a transmission mixer 308, an IF transmission block 310.1 an RF PLL block 312, an LO block 314, receiver block 316 and a receiver mixer 318 and an IF reception block 310.2. The transmission block 306 also includes multiple transmission paths 330, and the receiver block 316 also includes multiple receiver paths 332 forming a receive and a transmit phase antenna array respectively. Each of the receiver paths 332 corresponds to one of the transmission paths 330 based on an appropriate isolation factor. The IF transmission block 310.1 also includes an IF transmission amplifier 324. Also, the RF PLL block 312 includes a voltage-controlled oscillator (VCO) 326, the output of which is also connected to frequency divide by 3 block 327 and subsequently to a programmable attenuator 328. In an exemplary embodiment, the programmable attenuator 328 may be a 0 to −30 dB attenuator, to provide an example; however other types of attenuators may be possible without departing from the spirit and scope of the present disclosure.

Further, the communication system 300 also includes a loop-back path 320. The loop-back path 320 can be used to propagate a calibration signal throughout the communication system 300. The loop-back path 320 also utilizes a parasitic coupling effect to propagate the conversion signal from the transmission block 306 to the receiver block 316.

The communication system 300 also includes a conversion chip 304, which may represent an exemplary embodiment of the conversion module 202. In an exemplary embodiment, the conversion chip 304 may be a Broadcom Corporation BCM20110; however, the Broadcom Corporation BCM20110 is provided for illustrative purposes only, and it is not intended to be the only conversion module capable of being used herein, and is not meant to limit this disclosure. In particular, any conversion module that meets the strict specifications described in this disclosure may be used. Additionally, conversion chip 304 is a simplified version of a receiver, and is shown for illustrating the gain step calibration algorithm. Thus, the conversion chip 304 may represent an exemplary embodiment of the conversion module 202.

Additionally, the conversion chip 304 and the RF chip 302 are connected using a coaxial cable 322. Further, the loop-back path 320 includes the coaxial cable 322. Therefore, the conversion signal propagates between the RF chip 302 and the conversion chip 304, via the coaxial cable 322, to calibrate the communication system 300.

Figure 4:
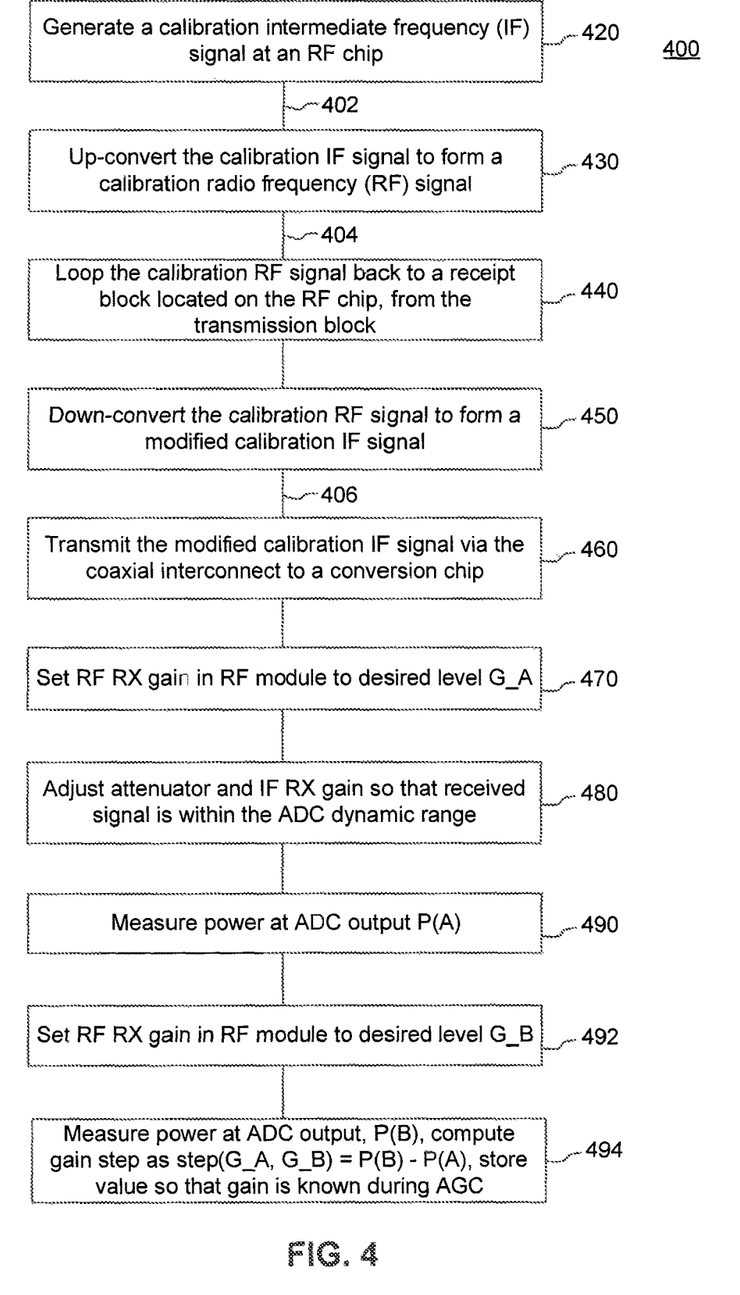
FIG. 4 is a flowchart of a first set of exemplary operation steps of calibrating a communication system according to an exemplary embodiment of the invention.

Referring also to FIG. 4, a flowchart of a first set of exemplary operation steps of calibrating a communication system according to an exemplary embodiment of the present disclosure is shown. The disclosure is not limited to this operational description. Rather, it will be apparent to persons skilled in the relevant art(s) from the teachings herein that other operational control flows are within the scope and spirit of the present disclosure. The following discussion describes the steps in FIG. 4.

Method 400 begins at step 420, with the generation of a calibration IF signal 402. The calibration IF signal 402 is generated at the RF chip 302. Further, the calibration IF signal 402 may be generated using the divided version of the VCO 326 as an IF source. In an exemplary embodiment, for the 60 GHz communication system, due to the frequency planning of the receiver, the VCO frequency divided by 3 block 327 (not shown in FIG. 4), produces a signal close to the IF frequency of 8.64 GHz. Since the RF channels supported are 58.32, 60.48, 62.64 and 64.8 GHz, the LO frequency is F_LO=F_RF−8.64 GHz. Since the VCO operates at half the LO frequency (the LO is produced by a frequency doubler following the VCO), the VCO frequency is F_VCO=(F_RF−8.64 GHz)/2, which results in 24.84 GHz, 25.92 GHz, 27 GHz and 28.08 GHz. After dividing by 3, the frequency of the calibration signal generated is 8.28 GHz, 8.64 GHz, 9 GHz or 9.36 GHz for the four different RF channels respectively. Those frequencies all fall within the IF bandwidth of the IF amplifiers which is F_IF+/−900 MHz, and thus the signal after the frequency divided by 3 block 327 can be used as an IF signal for RF gain step calibration.

The output of the frequency divided by 3 block 327 is followed by the programmable attenuator 328, which is configured to program the calibration signal to fall within the dynamic range of the transmit IF amplifier 324 which follows in the loopback path. Additionally, the calibration IF signal 402 may be a tone or a modulated signal. The method then proceeds to step 430. In step 430, the calibration IF signal 402 is up-converted to form a calibration RF signal 404. The up-conversion is performed at the TX mixer block 308 and transmission block 320, after initial amplification by IF amplifier 324. Amplifier 324 is configured such that it can receive its input either from the coaxial interconnect 322 or from the attenuator 328. Since the IF signal for calibration using this method is generated locally at the RF module 300, there is no need to use a calibration signal from the conversion module 304. Further, it would not have been possible to form a loopback from a single coaxial cable since both transmit IF and receive IF use the same frequency.

In an exemplary embodiment, the phased antenna array transmitter is configured so that only one of the N paths is active, since the calibration signal only needs to be transmitted from one antenna to loop back to the IF output of RF block 300. The method then proceeds to step 440. In step 440, at the output of the selected transmitter path, calibration RF signal 404 is looped back to the receiver block 316 from the transmission block 306. Additionally, the calibration RF signal 404 is looped back to the receiver block 316 using the parasitic coupling between the receiver block 316 and the transmission block 306. The method then proceeds to step 450. In step 450, after reception by the RF front-end, the calibration RF signal 404 is down-converted to form a modified calibration IF signal 406, The method then proceeds to step 460. In step 460, the modified calibration IF signal 406 is transmitted to the conversion chip 304 via the coaxial interconnect 322.

The method then proceeds to step 470. In step 470, the calibration signal is digitized, in the conversion chip 304, for the selected RF gain G_A. The method then proceeds to step 480. In step 480, the attenuator and TX IF gain are adjusted so that the signal fits the dynamic range of the analog-to-digital converter (ADC) located on the conversion chip 304. The method then proceeds to step 490. In step 490, the power at the ADC output is measured. The method then proceeds to step 492. In step 492, the RF gain is changed to G_B. The method then proceeds to step 494. In step 494, the power is measured at the ADC output a second time so that the difference, G_B−G_A=step_BA=P(B)−P(A), is computed and stored such that is can be used by the AGC algorithm, since it now has exact knowledge of the RF gain step. The method 400 may then be repeated for different gain steps.

In an exemplary embodiment, a power output of a power amplifier (PA) can be monitored using a transmit signal strength indicator (TSSI) circuit to calibrate the output power of the communication system. As mentioned previously in this disclosure, when the communication system is operating at 60 GHz, the absolute gain and the gain step can have large variations over PVT. Therefore, a correct PA output cannot be guaranteed, which can risk poor error vector magnitude (EVM) due to very high output (distortion limited) or very low output (noise limited) or violation of a spectral mask. Additionally, as mention previously in this disclosure, the antennas are integrated into an RF chip within the communication system. Thus, there is no way of performing production testing or other calibration of the communication system during production.

Figure 5:
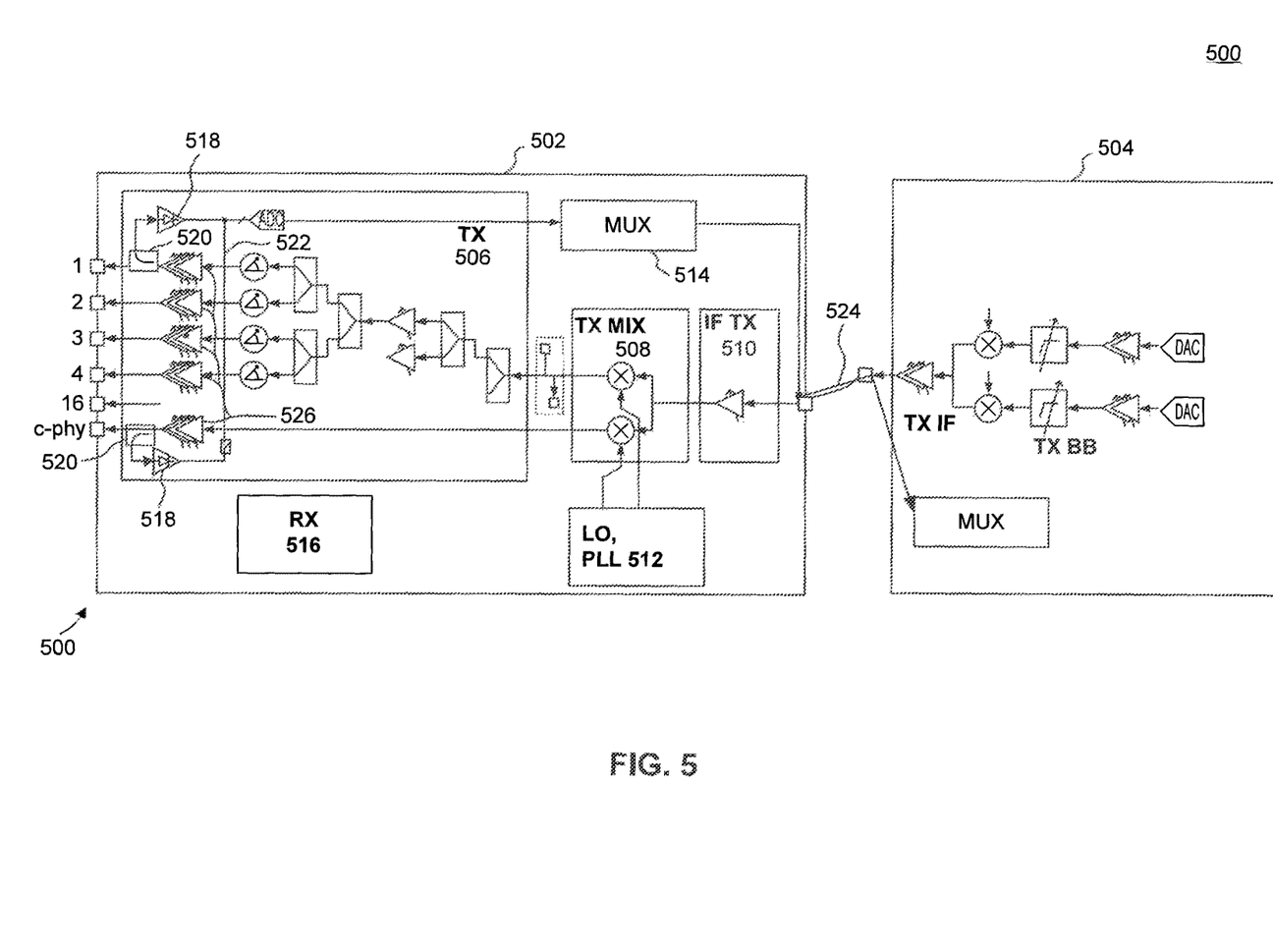
FIG. 5 is a schematic diagram of a communication system having a second loop-back path configured to calibrate an output power of the communication system according to an exemplary embodiment of the present disclosure.

Referring also to FIG. 5, a schematic diagram of a communication system having a second loop-back path configured to calibrate the communication system according to an exemplary embodiment of the present disclosure is shown.

Communication system 500 may represent an exemplary embodiment of the communication system 200. The communication system 500 includes an RF chip 502, which may represent an exemplary embodiment of the RF front-end module 206. In an exemplary embodiment, the RF chip 502 may be a Broadcom Corporation BCM20100; however, the Broadcom Corporation BCM20100 is provided for illustrative purposes only, and it is not intended to be the only RF chip capable of being used herein, and is not meant to limit this disclosure. In particular, any RF chip that meets the strict specifications described in this disclosure may be used.

Additionally, the RF chip 502 includes a transmission block 506, a transmission mixer 508, an IF transmission block 510, an LO PLL block 512, a multiplexer (MUX) 514 and a receiver block 516. The transmission block 506 also includes N transmission signal strength indicators (TSSIs) 518, N couplers 520, and N power amplifiers (PAs) 526. In an exemplary embodiment, N may be equal to the number of transmit paths. Each of the TSSIs 518 are coupled to the output one of the PAs 526 via on of the couplers 520. In an exemplary embodiment, each of the couplers 520 may be 20-30 dB couplers, to provide an example; however other types of couplers may be possible without departing from the spirit and scope of the present disclosure. Also, in such an exemplary embodiment, the MUX 514 may be a coaxial digital interface multiplexer, to provide an example. Further, the communication system 500 also includes a loop-back path 522. The loop-back path 522 can be used to propagate a calibration signal throughout the communication system 500. The aforementioned functional blocks are recited for illustrative purposes only, and it will become apparent to those skilled in the relevant art(s) that other functional blocks may be included within the RF chip 502 without departing from the spirit and scope of the present disclosure The communication system 500 also includes a conversion chip 504, which may represent an exemplary embodiment of the conversion module 202. In an exemplary embodiment, the conversion chip 504 may be a Broadcom Corporation BCM20110; however, the Broadcom Corporation BCM20110 is provided for illustrative purposes only, and it is not intended to be the only conversion module capable of being used herein, and is not meant to limit this disclosure. In particular, any conversion module that meets the strict specifications described in this disclosure may be used.

Additionally, the conversion chip 504 and the RF chip 502 are connected using a coaxial cable 524. Further, the loop-back path 522 includes the coaxial cable 524. Therefore, the conversion signal propagates between the RF chip 502 and the conversion chip 504, via the coaxial cable 524, to calibrate the communication system 500.

Figure 6:
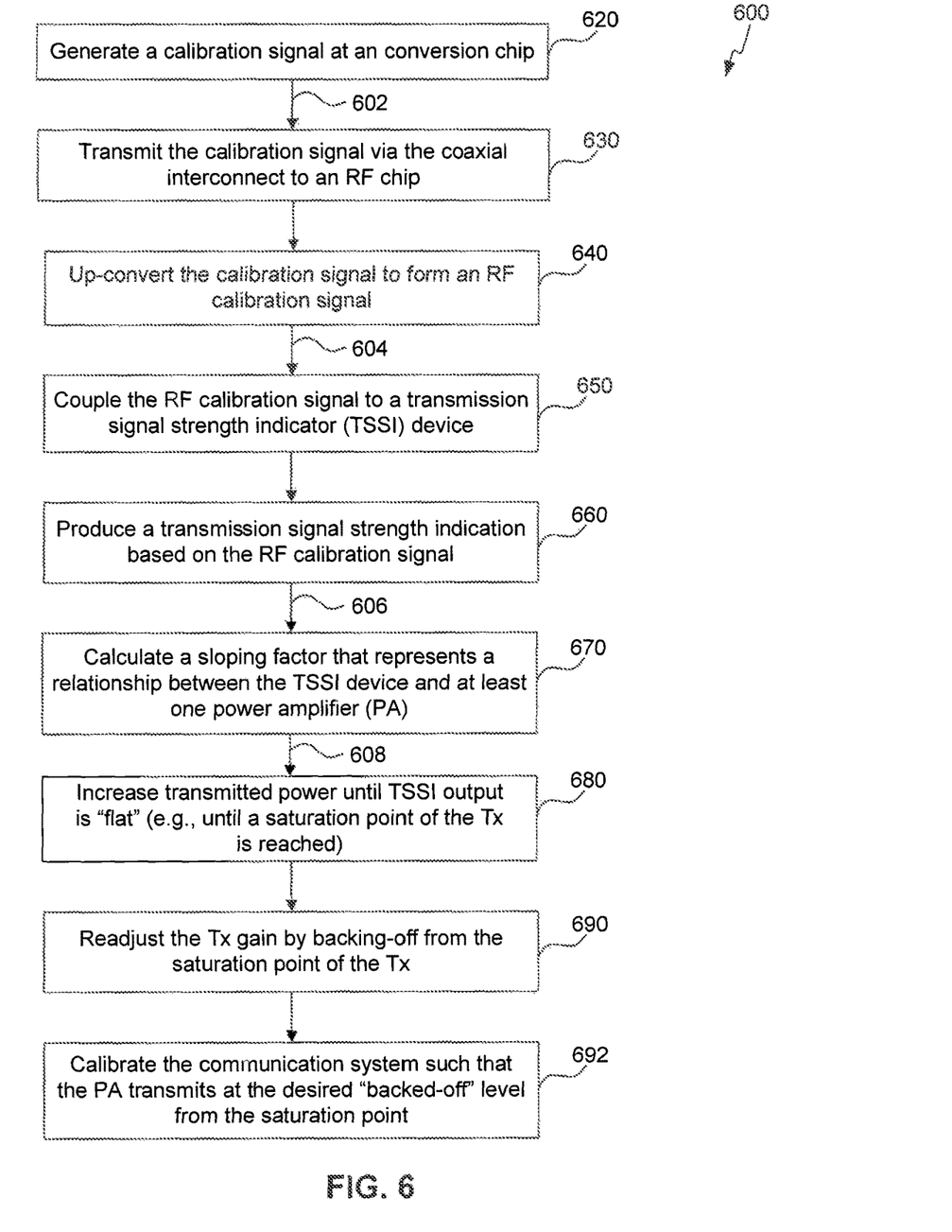
FIG. 6 is a flowchart of a second set of exemplary operation steps of calibrating a communication system according to an exemplary embodiment of the invention.

Referring also to FIG. 6, a flowchart of a second set of exemplary operation steps of calibrating a communication system according to an exemplary embodiment of the present disclosure is shown. The disclosure is not limited to this operational description. Rather, it will be apparent to persons skilled in the relevant art(s) from the teachings herein that other operational control flows are within the scope and spirit of the present disclosure. The following discussion describes the steps in FIG. 6

A method 600 begins at step 620, where a calibration signal 602 is generated. The generating of the calibration signal 602 occurs at the conversion chip 504. The method then proceeds to step 630. In step 630, the calibration signal 602 is transmitted to the RF chip 502 via the coaxial cable 524. The method then proceeds to step 640. In step 640, the calibration signal 602 is up-converted to form an RF calibration signal 604. The method then proceeds to step 650. In step 650, the RF calibration signal 604 is coupled to one of the TSSIs 518. The method then proceeds to step 660. In step 660, a transmission signal strength indication 606 is produced based on the RF calibration signal 604. The method then proceeds to step 670. In step 670, a sloping factor 608 is calculated, which represents a relationship between one of the TSSIs 518 and at least one of the PAs 526. The slope may be calculated by initially adjusting the transmit gain so that a small change in the digitally transmitted signal, results to a change in the TSSI output voltage. Using different transmitted power levels, a curve is calculated for the TSSI response and its linear part is used to compute the relation between the difference in TX power and the difference in TSSI output voltage controlled. The method then proceeds to step 680. In step 680, the transmitted power is increased by adjusting the gain until the TSSI output is "flat," thus indicating the saturation point of the TX. The method then proceeds to step 690. In step 690, the gain is readjusted by backing-off from the saturation point of the TX by a fixed dB amount, where the saturation point was determined using the calculated TSSI sloping factor 608. The method then proceeds to step 692. In step 692, the communication system 500 is calibrated such that it guarantees that the PA 526 transmits at the desired "backed-off" level from its saturation point.

Further, in an exemplary embodiment, the method 600 may also include digitizing the transmission signal strength indication 606 using an analog-to-digital converter (ADC). A digital word representing the output power of the at least one PA 526 may then be transmitted back to the conversion chip 504 via the coaxial interconnect 524. Additionally, the calibration signal 602 may include a tone or a modulated signal.

Additionally, in an exemplary embodiment, the calibration signal 602 may include a clock. In such an exemplary embodiment, following the step 630 where the calibration signal 602 is transmitted to the RF chip 502, the method 600 instead includes applying the clock to a control radio on the RF chip 502 such that the RF chip 502 automatically detects when the clock frequency is stable, and subsequently automatically calibrates itself. Removing the clock from the control radio on the RF chip 502 such that the RF chip 502 is powered down to a standby state. Auto-power down by clock removal functions both to conserve power, as well as to provide a high-temperature shut-down procedure in the event that the communication interface to the RF-chip fails at high-temperature. In such an exemplary embodiment, the communication system 500 may be calibrated without having to adjust the RF chip 502. This also allows the communication system 500 to compensate for PVT variations, printed circuit board (PCB) manufacturing variations, as well as different lengths of the coaxial cable 524. Part of the calibration of the RF chip 502 based solely on a clock includes calibration of the coaxial interconnect 524 between the RF chip 502 and the conversion chip 504, thereby bypassing the need to have any portion of the chip-to-chip interface (aside from the clock) functional prior to calibration of the RF-chip 502.

In an exemplary embodiment, the communication system 500 may also use a control radio startup calibration technique, which compensates for varying lengths of the coaxial cable 524 as well as PCB losses. In such an exemplary embodiment, first a clock is applied to the RF chip 502 which initiates self-calibration of the RF chip 502, as discussed above. Once calibration of the RF chip 502 is completed, communication between the conversion chip 504 and the RF chip 502 is attempted for different combinations of transmission power and data delay. For example, using this procedure the conversion chip 504 can find the TX power that corresponds to the optimum back-off from saturation for the receiver on the RF chip 502. Subsequently, a setting nearest the center of a successful cluster of combinations is selected in order to provide the best bit rate error (BRE) over voltage and temperature. Again, this technique allows the communication system 500 to be calibrated without having to adjust the RF chip 502.

An Exemplary Communication System Having Multiple Front-End Modules

Figure 71:
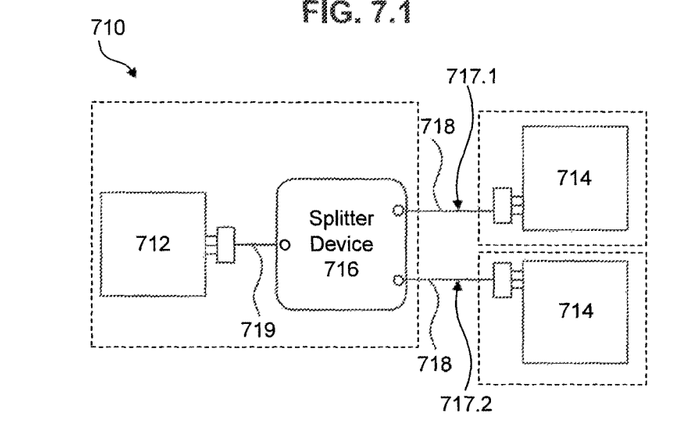

FIG. 7.1 is a block diagram of a communication system having multiple front-end modules according to exemplary embodiments of the present disclosure.

A communication system 710 includes a baseband to IF conversion module 712. The conversion module 712 may represent an exemplary embodiment of the conversion module 202. The communication system 710 also includes multiple IF to RF front-end modules 714. Each of the RF front-end modules 714 may represent an exemplary embodiment of the RF front-end module 206. Also, the communication system 710 includes a splitter device 716. Further, the communication system 710 includes a coaxial interconnect 718, which connects the multiple RF front-end modules 714 to the splitter device 716 and the splitter device 716 to the conversion module 712. In some embodiments, the splitter device 716 may include one or more power combiners, filters or switches, to provide some examples. The splitter device 716 may also perform a frequency based separation of an input signal. However, it will become apparent to those skilled in the relevant art(s) that other splitter device configurations and functionalities may be implemented without departing from the spirit and scope of the present invention.

In an exemplary embodiment, each of the RF front-end modules 714 may be connected to the splitter device 716 in a parallel configuration. Therefore, in such an exemplary embodiment, each of the RF front-end modules 714 are individually connected to the splitter device 716 via an individual coaxial interconnect 718, such that individual signals 717.1 and 717.2 are each transmitted to the splitter device 716 from one of the RF front-end modules 714. The splitter device 716 may then combine the individual signals 717.1 and 717.2 into a combined signal 719, which may be input into the conversion module 712. In such an exemplary embodiment, the splitter device 716 may function as a power combiner by coupling together the electromagnetic power contained within the individual signals 717.1 and 717.2 to form the combined signal 719.

As discussed above, the splitter device 716 may include a switch, For example, the splitter device 716 may be configured to select one of the individual signals 717.1 or 717.2, and to transmit the selected individual signal through to the conversion module 712, without splitting or combining the individual signals 717.1 and 717.2. The splitter device 716 may include two or more splitter devices. In particular, the two or more splitter device may be configured to perform spatial diversity.

Figure 72:
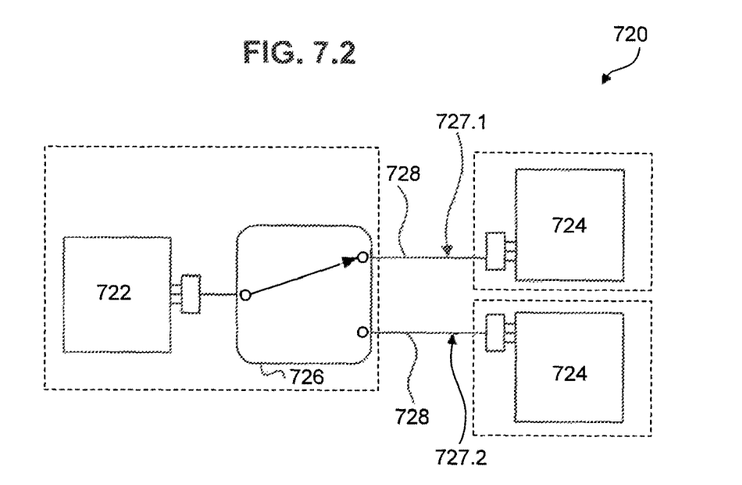

Referring also to FIG. 7.2, a block diagram of a communication system having multiple front-end modules according to exemplary embodiments of the present disclosure is shown.

A communication system 720 includes a conversion module 722. The conversion module 722 may represent an exemplary embodiment of the conversion module 202. The communication system 720 also includes multiple RF front-end modules 724. Each of the RF front-end modules 724 may represent an exemplary embodiment of the RF front-end module 206. Also, the communication system 720 includes a switching device 726, such as a single-pole double-throw (SPDT), single-pole changeover (SPCO), or double-pole single-throw (DPST), to provide some examples; however other types of switching devices may be possible without departing from the spirit and scope of the present disclosure. Further, the communication system 720 includes a coaxial interconnect 728, which connects the multiple RF front-end modules 724 to the switching device 726 and the switching device 726 to the conversion module 722.

In an exemplary embodiment, each of the RF front-end modules 724 may be connected to the switching device 726 in a parallel configuration. Therefore, in such an exemplary embodiment, each of the RF front-end modules 724 are individually connected to the switching device 726 via an individual coaxial interconnect 728, such that individual signals 727.1 and 727.2 are each transmitted to the switching device 726 from one of the RF front-end modules 724. The switching device 726 then selects one of the individual signals 727.1 and 727.2 to transmit through to the conversion module 722 by completing the connection to one of the RF front-end modules 724.

Figure 73:
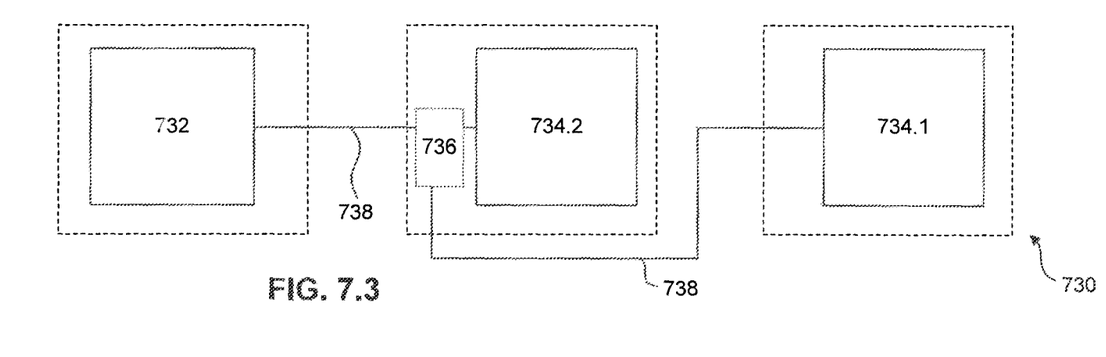

Referring also to FIG. 7.3, a block diagram of a communication system having multiple front-end modules according to exemplary embodiments of the present disclosure is shown.

A communication system 730 includes a conversion module 732. The conversion module 732 may represent an exemplary embodiment of the conversion module 202. The communication system 730 also includes a first RF front-end module 734.1 and a second RF front-end module 734.2. Both the first RF front-end module 734.1 and the second RF front-end module 734.2 may represent an exemplary embodiment of the RF front-end module 206. Also, the communication system 730 includes a coaxial interconnect 738, which connects the first RF front-end module 734.1 and the second RF front-end module 734.2 to the conversion module 732.

In an exemplary embodiment, the first RF front-end module 734.1 and the second RF front-end module 734.2 may be connected to the conversion module 732 in a series configuration. Therefore, in such an exemplary embodiment, the first RF front-end module 734.1 and the second RF front-end module 734.2 are connected to the conversion module 732 via the same coaxial interconnect 738. In particular, an output of the first RF front-end module 734.1 is input to a second splitter device 736, and an output of the second RF front-end module 734.2 is also input to the second splitter device 736. An output of the second splitter device 736 is then input to the conversion module 732. In an embodiment, the conversion module 732 may be configured to receive an input from N RF front-end modules using N−1 second splitter devices.

Each of the described connection schemes are provided for illustrative purposes only, and those skilled in the relevant art(s) will recognize that other types of configurations involving multiple RF front-end modules may be implemented without departing from the spirit and scope of the present disclosure. Additionally, it will become apparent to those skilled in the relevant art(s) that other types of intermediate devices (besides the splitter device 716 and the switching device 726) may be used to combine/select outputs from multiple RF front-end modules without departing from the spirit and scope of the present disclosure.

CONCLUSION

It is intended that the Detailed Description section of this patent document, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A communication system, comprising:
 a conversion module configured to convert a signal between a baseband (BB) and an intermediate frequency (IF);
 a radio frequency (RF) phased array front-end module comprising a power divider network, the power divider network comprising a plurality of interpolated RF amplifiers;
 a coaxial interconnect configured to connect the conversion module with the RF phased array front-end module; and
 a dedicated omnidirectional communication path separate from the RF phased array front-end module,
 wherein the conversion module is configured to generate a clock that is applied to a control radio associated with the RF phased array front-end module, wherein a high-temperature failure of the communication system causes the clock to be removed from the control radio and triggers the communication system to power down,
 wherein the conversion module is configured to generate a calibration signal that is applied to the RF phased array front-end module via the coaxial interconnect, and
 wherein the RF phased array front-end module comprises an active front-end (AFE) configured to reduce a deterioration of a signal associated with the communication over the coaxial interconnect.

2. The communication system of claim 1, wherein the RF phased array front-end module includes a plurality of antennas, an integrated local oscillator (LO), at least one mixer, a phase-locked loop (PLL), a power supply (PS), a power amplifier (PA), and a low-noise amplifier (LNA).

3. The communication system of claim 2,
 wherein the signal is converted to the IF using frequency mixing or heterodyning,
 wherein the communication system is a super-heterodyne 60 GHz phase antenna array transceiver, and
 wherein the signal is combined with one or more additional signals, over the coaxial interconnect, in accordance with a frequency multiplexing technique.

4. The communication system of claim 2, wherein the signal is split into a plurality of modulated signals, when in a transmission mode, and the plurality of modulated signals are input into the plurality of antennas included within the RF phased array front-end module, and wherein the plurality of antennas are configured to combine the plurality of modulated signals into a single combined signal, when in a receipt mode.

5. The communication system of claim 4, wherein the signal includes a direct current (DC) feed, a control interface, and a reference element associated with the RF phased array front-end module.

6. The communication system of claim 1, wherein the conversion module is integrated on a platform or on a wireless card.

7. The communication system of claim 1, wherein the communication system is implemented inside of a laptop computer, a tablet computing device, or a personal digital assistant (PDA).

8. The communication system of claim 1, wherein the conversion module includes:
 a first loop-back path configured to measure and calibrate a receipt IQ, wherein the first loop-back path extends between a transmission IF power amplifier and a receipt IF power amplifier;
 a plurality of second loop-back paths configured to facilitate measurement and calibration of a plurality of first baseband (BB) filters, wherein the plurality of second loop-back paths extend between outputs of the plurality of first BB filters and an analog-to-digital converter (ADC);
 a third loop-back path configured to facilitate the calibration of a plurality of second BB filters, wherein the third loop-back path extends between an output of a digital-to-analog converter (DAC) and inputs of the second BB filters; and a fourth loop-back path configured to measure and calibrate a transmission IQ, wherein the fourth loop-back path extends between an output of a power detector and the ADC.

9. The communication system of claim 1, wherein the RF phased array front-end module is connected to at least one of a multiplexer, a coaxial splitter device and a switching device using the coaxial interconnect for the RF phased array front-end module, and wherein at least one of the multiplexer, coaxial splitter device and the switching device is coupled to the conversion module.

10. The communication system of claim 1, wherein the RF phased array front-end module is serially connected or connected in parallel to the conversion module via the coaxial interconnect.

11. A method for communication, the method comprising:
converting a signal between a baseband and an intermediate frequency (IF);
converting the signal between the IF and a radio frequency (RF) using an RF phased array front-end module comprising a power divider network, the power divider network comprising a plurality of interpolated RF amplifiers;
reducing loss by transferring the IF signal to a programmable attenuator;
programming, using the programmable attenuator, the IF signal to fall within a dynamic range of an IF transmission amplifier;
communicating the signal at IF to the RF phased array front-end module using a coaxial interconnect;
communicating the signal at IF using a dedicated omnidirectional communication path separate from the RF phased array front-end module;
generating a clock;
applying the clock to a control radio associated with the RF phased array front-end module;
removing the clock from the control radio during a high-temperature failure;
triggering a system power down as a result of the clock being removed from the control radio;
generating a calibration signal at IF by dividing a voltage-controlled oscillator signal; and
communicating the calibration signal at IF to the RF phased array front-end module using the interconnect.

12. The method of claim 11, wherein the RF phased array front-end module includes a plurality of antennas, an integrated local oscillator (LO), at least one mixer, a phase-locked loop (PLL), a power supply (PS), a power amplifier (PA), and a low-noise amplifier (LNA).

13. The method of claim 11, wherein the method comprises combining the signal with one or more additional signals before communicating over the coaxial interconnect.

14. The method of claim 11, wherein the method comprises:
splitting the signal into a plurality of modulated signals, when in a transmission mode, and inputting the plurality of modulated signals into a plurality of antennas included within the RF phased array front-end module; and
combining the plurality of modulated signals into a single combined signal, when in a receipt mode.

15. The method of claim 11, wherein the signal includes a direct current (DC) feed, a control interface, and a reference element associated with the RF phased array front-end module.

16. The method of claim 11, wherein the conversion module is integrated on a wireless card.

17. The method of claim 11, wherein the method is implemented inside of a laptop computer, a tablet computing device, or a personal digital assistant (PDA).

18. The method of claim 11, wherein the method comprises:
measuring a receipt IQ in a first loop-back path that extends between a transmission IF power amplifier and a receipt IF power amplifier;
calibrating a plurality of first baseband (BB) filters in a plurality of second loop-back paths that extend between outputs of the plurality of first BB filters and an analog-to-digital converter (ADC);
calibrating a plurality of second BB filters in a third loop-back path that extends between an output of a digital-to-analog converter (DAC) and inputs of the second BB filters; and
measuring a transmission IQ in a fourth loop-back path that extends between an output of a power detector and the ADC.

19. The method of claim 11, wherein the RF phased array front-end module is connected to at least one of a multiplexer, a coaxial splitter device and a switching device using the coaxial interconnect for the RF phased array front-end module, and wherein at least one of the multiplexer, coaxial splitter device and the switching device is coupled to the conversion module.

20. The method of claim 11, wherein the RF phased array front-end module is serially connected or connected in parallel to the conversion module via the coaxial interconnect.

* * * * *